(12) United States Patent
Kim et al.

(10) Patent No.: US 9,204,242 B2
(45) Date of Patent: Dec. 1, 2015

(54) METHOD AND APPARATUS FOR MANAGING WIRELESS SENSOR NETWORK

(71) Applicant: ELECTRONICS AND TELECOMMUNICATIONS RESEARCH INSTITUTE, Daejeon (KR)

(72) Inventors: Mal-hee Kim, Daejeon (KR); Dong-Hwan Park, Daejeon (KR); Hyochan Bang, Daejeon (KR); Byung Bog Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 520 days.

(21) Appl. No.: 13/653,976

(22) Filed: Oct. 17, 2012

(65) Prior Publication Data

US 2013/0095867 A1 Apr. 18, 2013

(30) Foreign Application Priority Data

Oct. 18, 2011 (KR) ................ 10-2011-0106541
Oct. 5, 2012 (KR) ................ 10-2012-0110883

(51) Int. Cl.
*H04W 4/00* (2009.01)
*H04W 84/18* (2009.01)

(52) U.S. Cl.
CPC ............. *H04W 4/006* (2013.01); *H04W 84/18* (2013.01)

(58) Field of Classification Search
CPC ... G06F 19/345; G06F 19/3493; H04L 67/42; H04L 12/2803; H04L 12/2825; H04L 12/2832; H04L 43/065; H04L 43/16; H04L 41/02; H04W 4/008; H04W 84/18; H04W 4/04; H04W 24/00; G08B 25/08; G08B 25/009; G08B 25/10; G08B 29/14; G08B 21/02; G08B 21/0492; G08B 31/00; G08B 19/005; G08B 21/0469; G08B 25/006; H05K 7/20836

USPC ............... 700/1–3, 12, 9, 17, 276, 299, 300; 455/500, 7, 11.1, 422.1, 41.2, 404.1, 455/418, 574, 503, 519, 16; 340/539.22, 340/539.26; 370/311, 255, 310, 321

See application file for complete search history.

(56) References Cited

U.S. PATENT DOCUMENTS 5,961,595 A * 10/1999 Kawagoe et al. ............. 709/223
5,970,565 A * 10/1999 Dubner .......................... 15/210.1

(Continued)

FOREIGN PATENT DOCUMENTS

KR 10-0789919 B1 12/2007
KR 100825764 * 4/2008

(Continued)

*Primary Examiner* — Sujatha Sharma
(74) *Attorney, Agent, or Firm* — Ladas & Parry LLP (57) ABSTRACT

A sensor network management apparatus generates group specification information including requirements corresponding to an externally input service request, and forms a logical sensor network for the service request based on the generated group specification information. USN actuating information relating to USN (ubiquitous sensor network) resources included in the logical sensor network is generated, and USN resources are operated based on the USN actuating information.

14 Claims, 8 Drawing Sheets

(56) References Cited

U.S. PATENT DOCUMENTS

| | | | |
|---|---|---|---|
| 5,978,375 A * | 11/1999 | Petersen et al. | 370/395.6 |
| 7,430,186 B1 * | 9/2008 | Kim | 370/328 |
| 7,676,280 B1 * | 3/2010 | Bash et al. | 700/17 |
| 2005/0028001 A1 * | 2/2005 | Huang et al. | 713/200 |
| 2006/0069912 A1 * | 3/2006 | Zheng et al. | 713/151 |
| 2007/0103298 A1 * | 5/2007 | Kim et al. | 340/539.22 |
| 2011/0130849 A1 * | 6/2011 | Kim et al. | 700/12 |

FOREIGN PATENT DOCUMENTS

| | | |
|---|---|---|
| KR | 10-0987492 B1 | 10/2010 |
| KR | 1020110051708 A | 5/2011 |
| KR | 1020110056189 A | 5/2011 |
| KR | 1020110100935 A | 9/2011 |

\* cited by examiner

| LOCATION | INPUT |
|---|---|
| SENSING TYPE | INPUT |
| SENSING CONDITION | INPUT |
| ACTUATOR TYPE | INPUT |
| ACTUATOR CONDITION | INPUT |
| LOGIC | INPUT |

FIG. 5

| SENSING TYPE | SMOKE SENSOR |
|---|---|
| USN RESOURCE IDENTIFIER | Id#1 |
| USN RESOURCE CONNECTIVITY INFORMATION | IP, port# |
| USN RESOURCE-ASSISTED OPERATION | ONE-TIME INQUIRY, CONTINUITY INQUIRY, EVENT INQUIRY |
| SENSING TYPE | GAS SENSOR |
| USN RESOURCE IDENTIFIER | Id#2 |
| USN RESOURCE CONNECTIVITY INFORMATION | IP, port# |
| USN RESOURCE-ASSISTED OPERATION | ONE-TIME INQUIRY, CONTINUITY INQUIRY, EVENT INQUIRY |
| ACTUATOR TYPE | ALARM |
| USN RESOURCE IDENTIFIER | Id#3 |
| USN RESOURCE CONNECTIVITY INFORMATION | IP, port# |
| ACTUATOR OPERATING CONDITION | ALARM : turn On / turn Off |
| ACTUATOR TYPE | MESSAGE TRANSMITTER |
| USN RESOURCE IDENTIFIER | Id#4 |
| USN RESOURCE CONNECTIVITY INFORMATION | IP, port# |
| ACTUATOR OPERATING CONDITION | TRANSMISSION |
| SERVICE LOGIC | IF SMOKE LEVEL IS 30 OR HIGHER AND GAS LEVEL THERE IS 30 OR HIGHER, ALARM WILL SOUND AND EMERGENCY MESSAGE WILL BE REPORTED TO FIRE STATION #1 AND POLICE STATION#1 |

SENSOR NETWORK GENERATOR →

METHOD AND APPARATUS FOR MANAGING WIRELESS SENSOR NETWORK

CROSS-REFERENCE TO RELATED APPLICATION

This application claims priority to and the benefit of Korean Patent Application No. 10-2011-0106541 and 10-2012-0110883 filed in the Korean Intellectual Property Office on Oct. 18, 2011 and Oct. 5, 2012, the entire contents of which are incorporated herein by reference.

BACKGROUND OF THE INVENTION (a) Field of the Invention

The present invention relates to a method and apparatus for configuring and managing a sensor network.

(b) Description of the Related Art

A wireless sensor network USN, which is a kind of wireless sensor network, includes a variety of USN resources, and the USN resources include a variety of sensor nodes and actuator nodes. When providing service using the USN resources, an application system of equipment for providing service knows specific USN resources to be used in advance, and then sends a request for a predetermined process required to provide service for each of the USN resources and receives and processes the result value. At this point, the application system has to obtain the identifier of a required USN resource, connectivity information, and information about a process in advance, such as an operation to be requested. In general, the application system receives the above-mentioned information by an information repository, such as USN middleware storing information about USN resources, and obtains information about required USN resources offline. From the viewpoint of an application developer, however, detailed information about available physical resources, as well as information about services to be provided to a user, are required to enable the development of applications appropriate for the services. Thus, the acquisition of information about physical resources has been a heavy burden for the development of applications.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for efficiently forming and managing a sensor network. Furthermore, the present invention has been made in an effort to provide an apparatus and method for forming a sensor network in response to a request from an application system and providing a result of management to the application system.

An exemplary embodiment of the present invention provides a method for managing a sensor network. The method includes receiving a service request from the outside, and analyzing the received service request; generating group specification information including requirements for each of the categories for logical USN (ubiquitous sensor network) resources required to handle the service request based on the analysis result; forming a logical sensor network consisting of physical USN resources based on the group specification information; generating USN actuating information relating to the physical USN resources, based on metadata relating to the physical USN resources constituting the formed logical sensor network; actuating each of the USN resources constituting the logical sensor network based on the USN actuating information; and receiving actuation results from the USN resources.

The USN resources may include at least either of one sensor node or one actuator node, a sensor group consisting of a plurality of sensor nodes, or an actuator group consisting of a plurality of actuator nodes.

Here, in the generating of group specification information, the group specification information may include the location and sensing condition for a sensing type and the location and actuator operating condition for an actuator type, and further comprises a service logic.

Meanwhile, in the creating of a logical sensor network, a sensor node and an actuator node associated with the requirements for the sensing type and actuator type contained in the group specification information may be selected, and in the generating of USN actuating information, the USN actuating information may include information for the identification and connection of each of the sensor node and actuator node constituting the logical sensor network, based on metadata for each USN resource stored in a repository.

Also, in the generating of USN actuating information, the USN actuating information may include an identifier, connectivity information of the USN resources, and an assisted operation representing an operation to be performed by the corresponding USN resources, and further comprises a service logic.

In addition, the receiving of actuation results may include Issuing a request to perform the corresponding assisted operation for each of the USN resources corresponding to a sensor node based on the USN actuating information; receiving a first result of performing the operation for each of the USN resources corresponding to the sensor node; performing the service logic based on the first result; if the first result satisfies a preset condition as a result of performing the service logic, issuing a request to perform the corresponding assisted operation for each of the USN resources corresponding to an actuator node; and receiving a second result of performing the operation for each of the USN resources corresponding to the actuator node.

Further, the method may include transmitting or outputting the first result and the second result to service equipment.

Meanwhile, in the analyzing, if the service request contains keywords, the keywords may be analyzed to acquire keywords associated with the categories of location, sensing type, sensing condition, actuator type, actuator operating condition, and service logic.

Here, in the analyzing may further include receiving and analyzing a service request from service equipment including an external application, and passing the actuation results to the service equipment.

Another exemplary embodiment of the present invention provides an apparatus for managing a sensor network connected to a plurality of USN (ubiquitous sensor network) resources. The apparatus includes a service request analyzer that receives a service request from the outside, analyzes the received service request, and generates group specification information including requirements for each of the categories for logical USN resources required to handle the service request based on the analysis result; a resource metadata repository that stores metadata for each of the USN resources; a sensor network generator that forms a logical sensor network consisting of physical USN resources based on the group specification information, and generates USN actuating information relating to the physical USN resources, based on metadata relating to the physical USN resources constituting the formed logical sensor network; and a sensor network controller that actuates each of the USN resources constituting the logical sensor network based on the USN actuating information, and receives actuation results from the USN resources.

The apparatus may further include a service result processor that receives and analyzes a service request from service equipment including an external application and passes the actuation results to the service equipment.

Here, the service request may include location, sensing type, sensing condition, actuator type, actuator operating condition, and service logic, and the sensor network management apparatus may provide an input window for entering data for each category contained in the service request.

The USN resources may include at least either of one sensor node or one actuator node, a sensor group consisting of a plurality of sensor nodes, or an actuator group consisting of a plurality of actuator nodes, and the group specification information comprises the location and sensing condition for a sensing type corresponding to a sensor node and the location and actuator operating condition for an actuator type corresponding to an actuator node, and further comprises a service logic.

The sensor network generator may select a sensor node and an actuator node associated with the requirements for the sensing type and actuator type contained in the group specification information to form the logical sensor network, and the USN actuating information may include information for the identification and connection of each of the sensor node and actuator node constituting the logical sensor network.

Also, the USN actuating information may include an identifier, connectivity information of the USN resources, and an assisted operation representing an operation to be performed by the corresponding USN resources, and further comprises a service logic.

The sensor network controller may issue a request to perform the corresponding assisted operation for each of the USN resources corresponding to a sensor node based on the USN actuating information and receive a first result of performing the operation for each of the USN resources, and issue a request to perform the corresponding assisted operation for each of the USN resources corresponding to an actuator node based on the USN actuating information and receive a second result of performing the operation for each of the USN resources corresponding to the actuator node.

Here, if the first result satisfies a preset condition based on a result of performing the service logic, the sensor network controller may acquire the second result.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a method and apparatus for managing a sensor network according to an exemplary embodiment of the present invention will be described with reference to the accompanying drawings.

Figure 1:
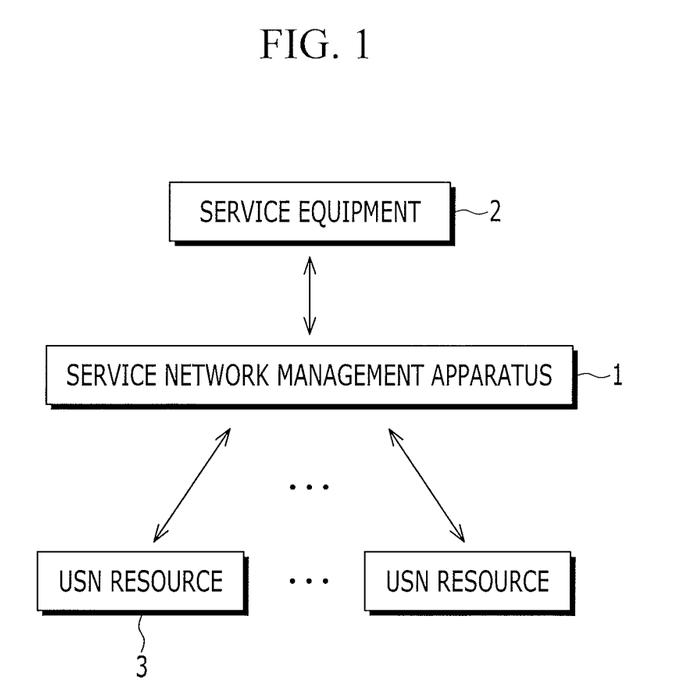
FIG. 1 is a view showing a network environment of an apparatus for managing a sensor network according to an exemplary embodiment of the present invention.
Figure 2:
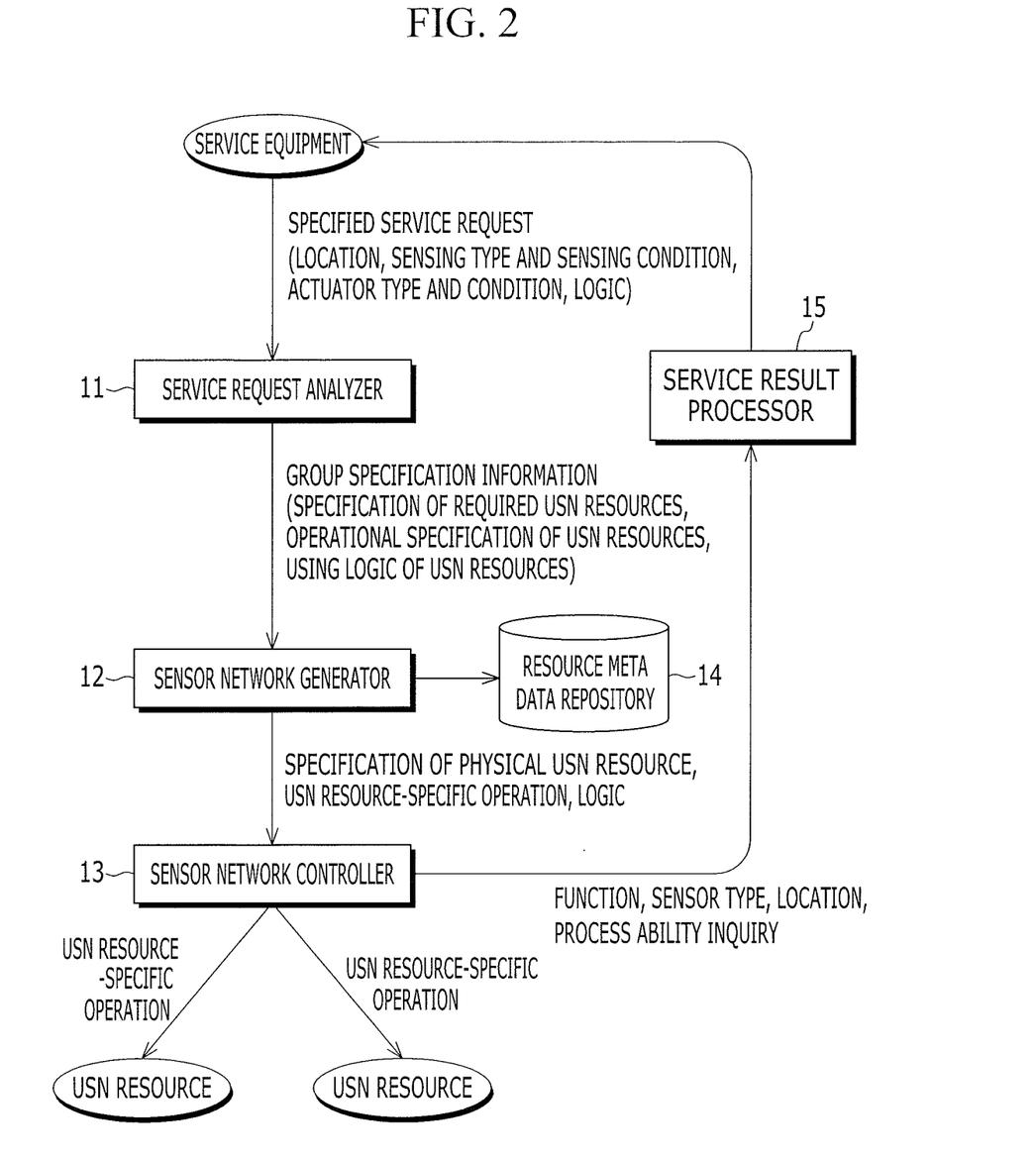
FIG. 2 is a view showing a structure of the apparatus for managing a sensor network.

FIG. 1 is a view showing a network environment of an apparatus for managing a sensor network according to an exemplary embodiment of the present invention, and FIG. 2 is a view showing a structure of the apparatus for managing a sensor network.

As shown in FIG. 1, a sensor network management apparatus 1 according to an exemplary embodiment of the present invention receives a service request from service equipment 2, etc., handles the service request in conjunction with a plurality of USN (ubiquitous sensor network) resources 3, and provides a result thereof to the service equipment 2. The service equipment 2 is equipment including applications for providing service based on information provided thorough USN resources. The USN resources include at least either of one sensor node or one actuator node, or a sensor group consisting of a plurality of sensor nodes, or an actuator group consisting of a plurality of actuator nodes.

As shown in FIG. 2, the sensor network management apparatus 1 includes a service request analyzer 11, a sensor network generator 12, a sensor network controller 13, a resource metadata repository 14, and a service result processor 15.

The service request analyzer 11 receives and analyzes an input service request, and generates information about a resource group for handling a service request based on a result of analysis. The resource group includes logical USN resources for handling a service request, and the information about the resource group may be referred to as group specification information which is information including requirements for the logical USN resources. The logical USN resources represent not physical USN resources which substantially exist, but resources which are logically required to handle the corresponding service request.

The service request may be provided from the service equipment 1 or through a separate input window. The service request includes specific requirements for desired service, and represents specific details regarding information to be provided through USN resources.

Figure 3:
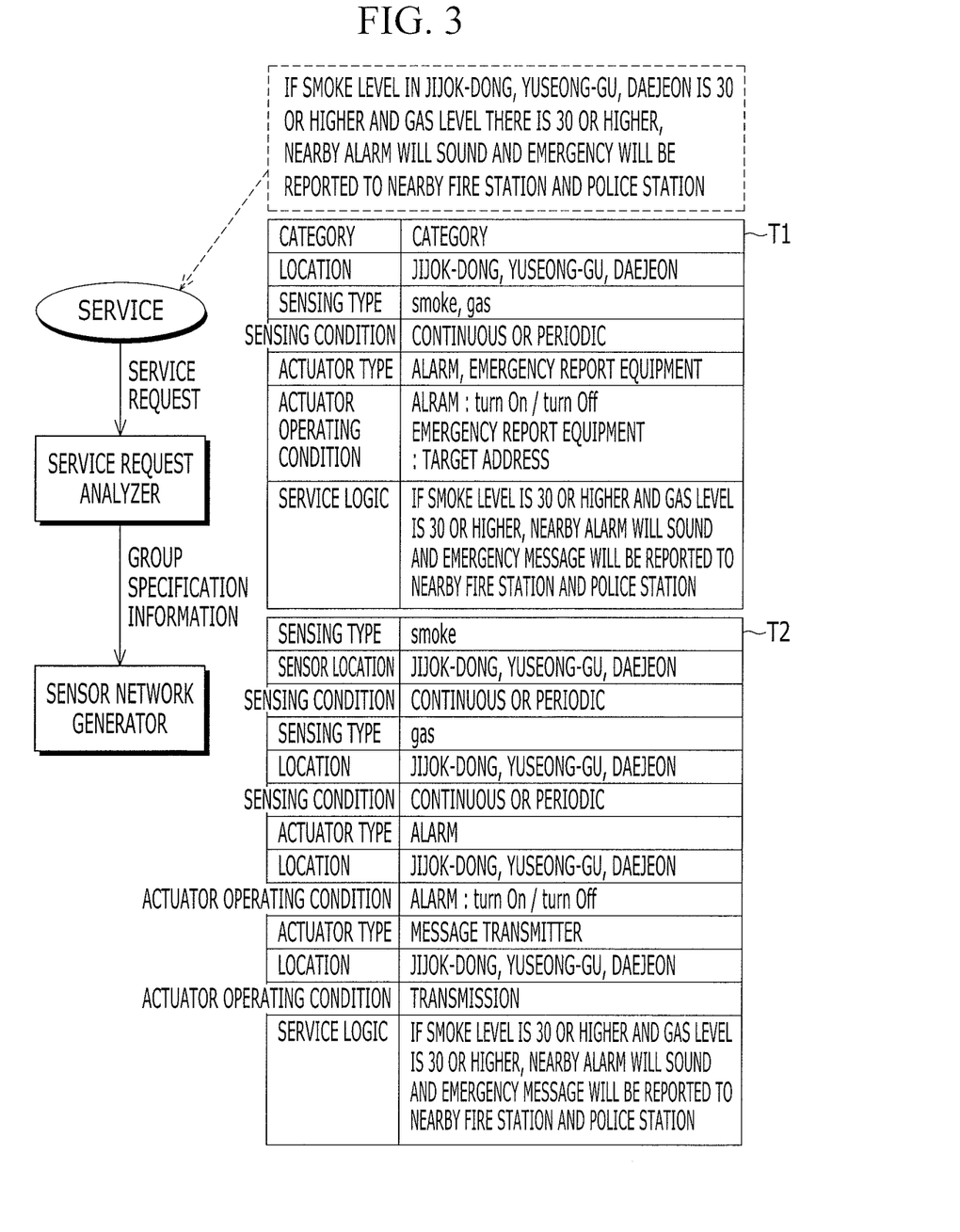
FIG. 3 is an illustration showing a service request and group specification information according to an exemplary embodiment of the present invention.

FIG. 3 is an illustration showing a service request and group specification information according to an exemplary embodiment of the present invention.

The service request includes the location where the user wants to receive information, the sensing type indicating the type of desired sensing information, the sensing condition indicating an information sensing period, the actuator type indicating the type of actuator node, i.e., actuator, for performing a specific operation in accordance with sensing information, the actuator operating condition indicating an operation performed by the actuator, and the service logic indicating a logic associated with desired service. The service request may contain keywords indicating information relating to categories such as location, sensing type, sensing condition, actuator type, actuator operating condition, and service logic. Alternatively, the service request may contain specific information for each category.

For example, as shown in FIG. 3, the service request may contain keywords as in "if the smoke level in Jijok-dong, Yuseong-gu, Daejeon is 30 or higher and the gas level there is 30 or higher, a nearby alarm will sound and an emergency will be reported to a nearby fire station and police station". The service request analyzer 11 receives and analyzes such a service request including keywords, extracts keywords corresponding to requirements, and determines requirements associated with each of the categories, such as the location "Jijok-dong, Yuseong-gu, Daejeon", the sensing type "smoke and gas", the sensing condition "continuous or periodic", the actuator type "alarm and emergency report equipment", the actuator operating condition "alarm: turn on/turn off and emergency report equipment: target address", and the service logic "if the smoke level in Jijok-dong, Yuseong-gu, Daejeon is 30 or higher and the gas level there is 30 or higher, a nearby alarm will sound and an emergency will be reported to a nearby fire station and police station".

Figure 4:
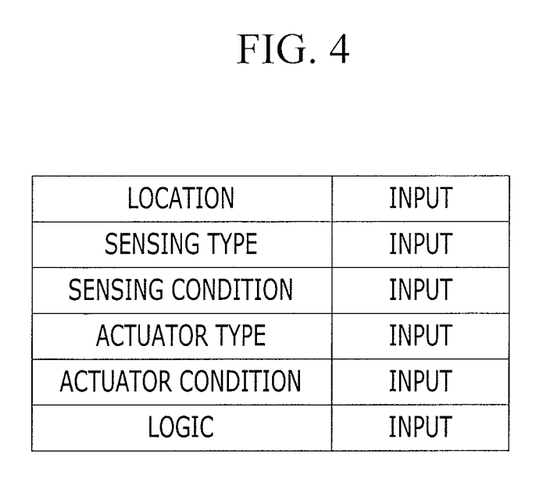
FIG. 4 is an illustration showing an input window.

Alternatively, as shown in the Table T1 of FIG. 3, a service request including corresponding requirements for each category may be input. To this end, the sensor network management apparatus 1 may provide an input window for entering requirements for each service. For example, an input window for entering requirements for each of the categories may include location, sensing type, sensing condition, actuator type, actuator operating condition, and service logic. FIG. 4 is an illustration showing an input window.

The service request analyzer 11 generates group specification information about resource groups of logical USN resources for handling a service request based on a result of analysis of the service request. As illustrated in FIG. 3, group specification information including requirements for the sensing type and actuator type identified from the service request is generated. The group specification information includes the location and sensing condition for the sensing type and the location, actuator operating condition, and service logic for the actuator type. For example, as shown in FIG. 3, if the sensing type in the service request is smoke and gas, and the actuator type in the service request is a alarm and an emergency report equipment, the group specification information may include a location and sensing condition corresponding to the sensing type "smoke", a location and sensing condition corresponding to the sensing type "gas", a location and actuator operating condition corresponding to the actuator type "alarm", a location and actuator operating condition corresponding to the actuator type "emergency report equipment", and a service logic.

The sensor network generator 12 forms a sensor network consisting of actual physical USN resources based on the group specification information passed from the service request analyzer 11, and generates information relating to the actual physical USN resources constituting the formed sensor network. To this end, the sensor network generator 12 generates USN actuating information relating to the actual USN resources, which corresponds to the group specification information, based on metadata for each USN resource stored in the resource metadata repository 14. The thus-formed sensor network may also be referred to as a logical sensor network, which is dynamically formed to handle a service request.

Figure 5:
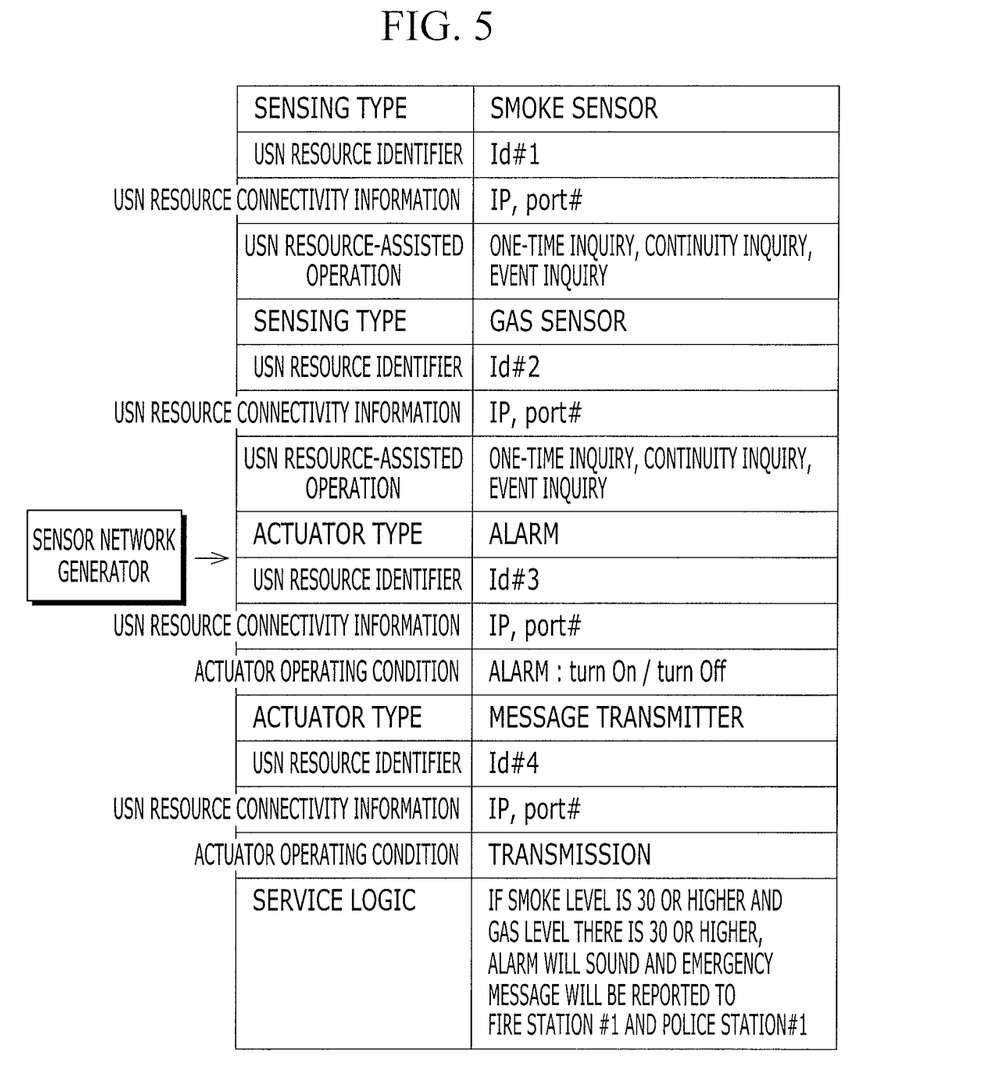
FIG. 5 is an illustration showing USN actuating information generated by a sensor network generator according to an exemplary embodiment of the present invention.

FIG. 5 is an illustration showing USN actuating information generated by a sensor network generator according to an exemplary embodiment of the present invention.

For example, when group specification information as illustrated in FIG. 3 is generated and passed to the sensor network generator 12, the sensor network generator 12 searches the resource metadata repository 14 based on the requirements for the sensing type contained in the group specification information, and finds sensor nodes corresponding to the sensing type. Then, a sensor node at a location corresponding to the "location" requirement is selected among the sensor nodes of the corresponding sensing type. For example, smoke sensors corresponding to the sensing type "smoke" are found, and a smoke sensor located in the requirement "Jijok-dong, Yuseong-gu, Daejeon" is selected from the smoke sensors.

Also, the sensor network generator 12 searches the resource metadata repository 14 based on the requirements for the actuator type contained in the group specification information, and finds actuator nodes corresponding to the actuator type. Then, an actuator node at a location corresponding to the "location" requirement is selected among the sensor nodes of the corresponding actuator type. For example, alarms, i.e., actuator nodes, corresponding to the actuator type "alarm" are found, and an alarm located in the requirement "Jijok-dong, Yuseong-gu, Daejeon" is selected from the alarms.

The sensor network generator 12 selects a sensor node and an actuator node, which are associated with the requirements for the sensing type and actuator type contained in the group specification information to create a sensor network, and generates USN actuating information including information for the identification, connection, and actuation of each of the sensor node and actuator node constituting the sensor network.

The USN actuating information includes a resource identifier, resource connectivity information, and a resource-assisted operation for the sensing type; a resource identifier, resource connectivity information, and an actuator operating condition for the actuator type; and a service logic.

As shown in FIG. 4, such USN actuating information includes a USN resource identifier "Id#1", USN resource connectivity information "IP" or "port#", and USN resource-assisted operations "one-time query, continuous query, and event query", for a sensor node "smoke sensor" which is selected based on the group specification information and configures the sensor network. Also, the USN actuating information including a USN resource identifier Id#2, USN resource connectivity information, and USN resource-assisted operations is generated for the sensor node "gas sensor". Here, the USN resource-assisted operations may include at least one of "one-time query, continuous query, and event query". The one-time query represents transmitting an information request query once to a sensor node and terminating the query in order to obtain one-time sensing information by a one-time query from the sensor node. The continuous query represents transmitting an information request query to a sensor node in order to continuously obtain sensing information during a predetermined period in a cycle requested by the sensor node. The continuous query represents an operation that enables a USN resource; i.e., a sensor node, to operate corresponding to the sensing type "continuous or periodic" stated in the group specification information. The event query represents transmitting a request query to enable a sensor node to obtain sensing information or transmit the sensing information to the sensing node if an event satisfying a preset condition occurs.

USN actuating information including a USN resource identifier "Id#3", USN resource connectivity information "IP" or "port#", and actuator operating condition "turn on/turn off" is generated for an actuator node "alarm" which is selected based on the group specification information and configures the sensor network. Also, USN actuating information including a USN resource identifier "Id#4", USN resource connectivity information "IP" or "port#", and actuator operating condition "transmission" is generated for an actuator node "message transmitter (emergency report equipment)".

Further, the USN actuating information further includes a service logic "if the smoke level in Jijok-dong, Yuseong-gu, Daejeon is 30 or higher and the gas level there is 30 or higher, a nearby alarm will sound and an emergency will be reported to a nearby fire station and police station".

In this way, USN actuating information including the identifiers and connectivity information of the sensor nodes and actuator nodes, which are substantial USN resource constituting the sensor node, operations for actuating each of the nodes, and all service logics is generated. The USN resources are substantially driven based on such USN actuating information.

Figure 6:
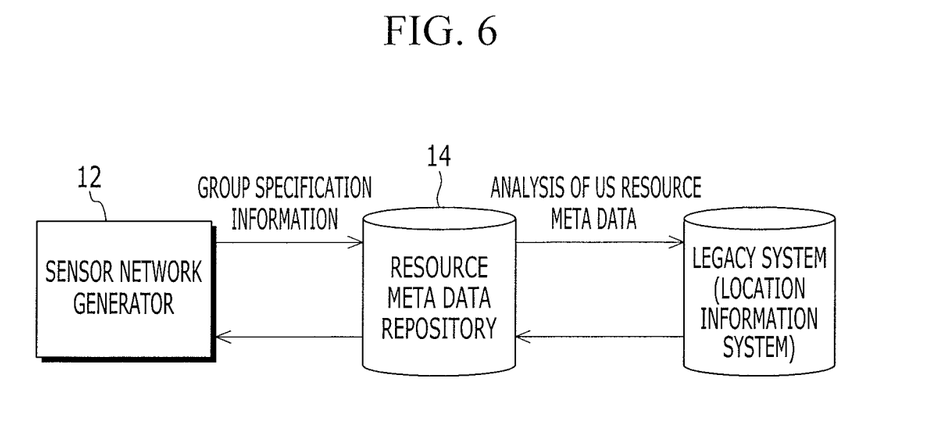
FIG. 6 is a view showing the operating characteristics of a resource metadata repository according to an exemplary embodiment of the present invention.

The resource metadata repository 14 for storing and managing metadata by USN resource may operate as shown in FIG. 6.

FIG. 6 is a view showing the operating characteristics of a resource metadata repository according to an exemplary embodiment of the present invention.

As shown in FIG. 6, the resource metadata repository 14 may receive, store, and manage information relating to USN resources in conjunction with a legacy system (e.g., location information system). The form of representation of location information or time information contained in the group specification information may be different from that of metadata stored in the resource metadata repository 14. For example, the form of representation of location information or time information may differ according to the application that the service equipment 2 is to implement. In a concrete example, location information "Complex 4, Yeolmae Village, Jijok-dong, Yuseong-gu, Daejeon" may be presented using latitude and longitude. Therefore, even if the form of representation of location information from the sensor network generator 12 is different from the form of representation of stored metadata, the resource metadata repository 14 finds and provides metadata relating to optimum USN resources corresponding to the location information "Complex 4, Yeolmae Village, Jijok-dong, Yuseong-gu, Daejeon" by taking into consideration the differences between these forms of representation. For example, when location information of metadata is in a first representation form using latitude and longitude, if the sensor network generator 12 provides information taking a second representation form such as the address "Complex 4, Yeolmae Village, Jijok-dong, Yuseong-gu, Daejeon" and issues a request for related metadata, the location information taking the second representation form may be converted into location information of the first representation form, and metadata about USN resources at the corresponding location may be found and provided to the sensor network generator 12.

The sensor network controller 13 controls substantial USN resources connected through the network, based on USN resource actuating information passed from the sensor network generator 12, so that the USN resources are operated to perform an operation corresponding to the USN resource actuating information. The sensor network controller 13 receives results of performing the operation from the USN resources, and provides them to the service result processor 15.

Figure 7:
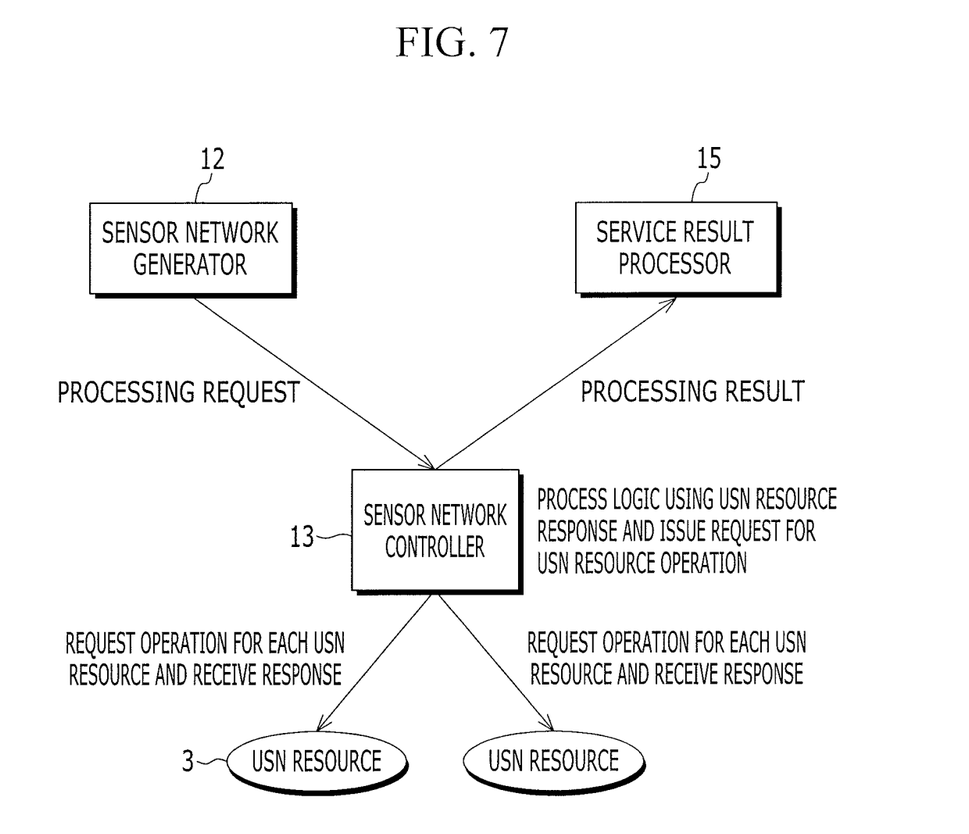
FIG. 7 is a view showing the operation of a sensor network controller according to an exemplary embodiment of the present invention.

FIG. 7 is a view showing the operation of a sensor network controller according to an exemplary embodiment of the present invention.

The sensor network controller 13 receives a processing request, along with USN actuating information corresponding to a formed network, in order to perform a service logic corresponding to a service request from the sensor network generator 12. In response to this processing request, the sensor network controller 13 issues a request to perform a predetermined operation for each USN resource based on the USN actuating information, and receives a response.

For example, in accordance with the USN actuating information, the sensor network controller 13 transmits, to the smoke sensor having the USN resource connectivity identifier "Id#1", a query message for performing a USN resource-assisted operation, which is either one of one-time query, continuous query, and event query, based on the USN resource connectivity information. Accordingly, the smoke sensor with "Id#1" measures a surrounding smoke concentration, and transmits a result of the measurement to the sensor network controller 13.

Also, a query message for performing a USN resource-assisted operation, which is either one of one-time query, continuous query, and event query, based on the USN resource connectivity information is transmitted to the gas sensor with "Id#2". Accordingly, the gas sensor with "Id#2" measures a surround gas concentration, and transmits a result of the measurement to the sensor network controller 13.

In this way, the sensor network controller 13 controls related sensor nodes to perform a corresponding operation for each of USN resources contained in the sensor type based on the USN actuating information, and receives a control result. Also, the sensor network controller 13 performs a service logic contained in the USN resource actuating information, and operates the USN resources contained in the actuator type based on a result of performing the service logic. For example, if transmission results (smoke concentration, gas concentration, etc.) of performing the service logic and performing the operations of the smoke sensor and the gas sensor exceed the values defined in the service logic, that is, the smoke level is 30 or higher and the gas level is 30 or higher, the corresponding actuator node is actuated based on the actuator type information contained in the USN actuating information. Accordingly, in accordance with the actuator type information contained in the USN resource actuating information, the sensor network controller 13 transmits, to the alarm with the identifier "Id#3", a message for performing a operation, i.e., "turn-on" operation, corresponding to the actuator operating condition based on the USN resource connectivity information. Moreover, the sensor network controller 13 transmits, to the message transmitter with the identifier "Id#4", a message for performing an operation, i.e., "transmission" operation, corresponding to the actuator operating condition based on the USN resource connectivity information. Accordingly, the alarm with "Id#3" is turned on and performs an alarm operation, and the message transmitter "Id#4" transmits a message for reporting the occurrence of an emergency to a preset police station or fire station. The alarm and the message transmitter transmit a result of performing a requested operation to the sensor network controller 13.

The sensor network controller 13 controls the USN resources to perform a predetermined operation for each resource for the sensor type based on the USN actuating information, and receives results of performing the operation from the USN resources for the sensor type and performs the service logic. If a predetermined condition is satisfied by performing the service logic, the USN resources are controlled to perform a predetermined operation for each resource for the actuator based on the USN actuating information, and receive results of performing the operation from the USN resources for the actuator type. Afterwards, the sensor network controller 13 provides, to the service result processor 15, processing results of the USN resources for the sensor type and actuator type and a processing result of performing the service logic.

The service result processor 15 transmits or outputs, to the service equipment 2, the processing results of the USN resources and the processing result of performing the service logic, which are passed from the sensor network controller 13.

Meanwhile, the formed logical sensor network may be terminated upon termination of a service according to the service request. That is, the service result processor 14 notifies the sensor network generator 12 of the transmission or outputting of a processing result to the service equipment 2, and therefore the sensor network generator 12 terminates the current logical sensor network. Accordingly, the USN resources used for the creation of the logical sensor network may be reused as components for creating a network in response to a different service request.

A method for managing a wireless sensor network according to an exemplary embodiment of the present invention will now be described based on the apparatus having the above-described structure.

Figure 8:
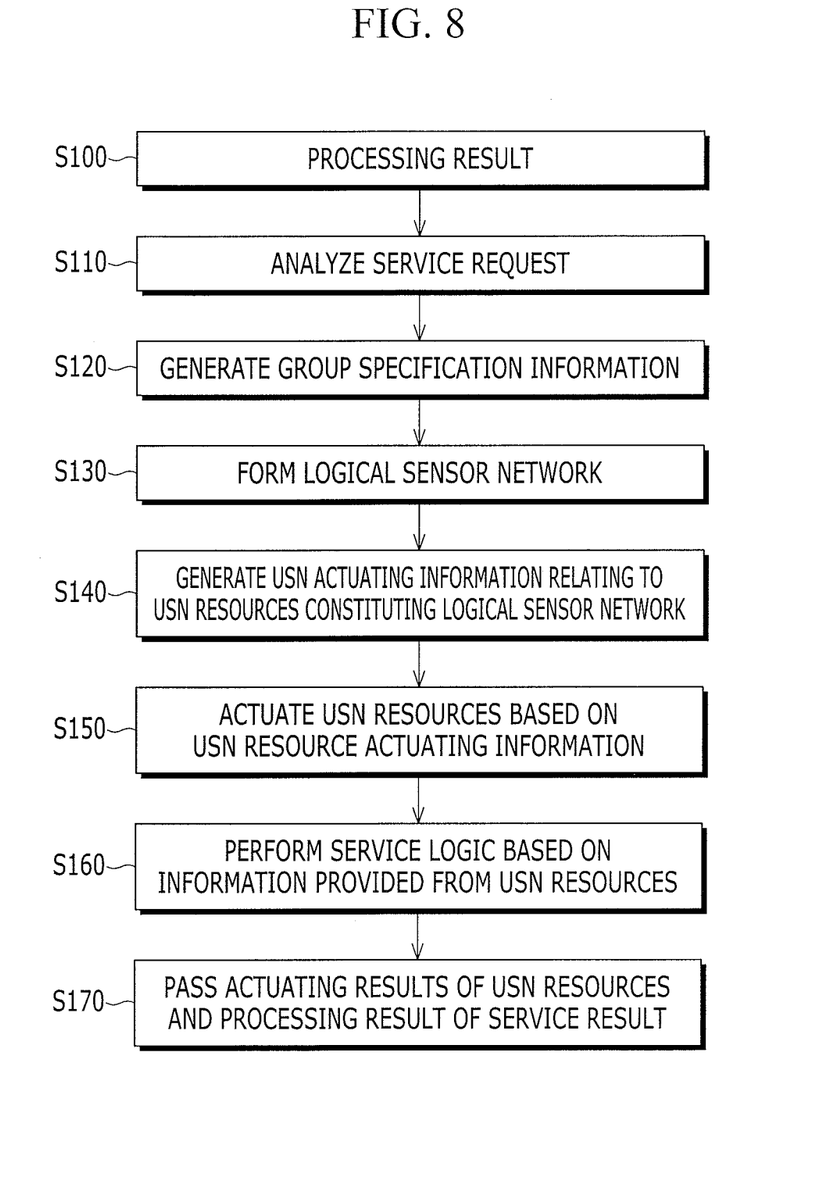
FIG. 8 is a flowchart of a method for managing a wireless sensor network according to an exemplary embodiment of the present invention.

FIG. 8 is a flowchart of a method for managing a wireless sensor network according to an exemplary embodiment of the present invention.

As shown in FIG. 8, service equipment 2 that is to develop a predetermined application using USN resources and provide a predetermined service transmits a service request to the sensor network management apparatus 1, or a user wanting to develop an application enters a service request into the sensor network management apparatus 1 through an input window provided by the sensor network management apparatus 1 (S100).

The service request analyzer 11 of the sensor network management apparatus 1 analyzes the service request input (S110), and generates group specification information for handling the service request based on an analysis result (S120). The group specification information including requirements for each of the categories of logical USN resources for handling a service request is passed to the sensor network generator 12.

The sensor network generator 12 forms a logical sensor network consisting of actual physical USN resources based on the group specification information (S130), and generates information relating to the actual physical USN resources constituting the formed sensor network. That is, the sensor network generator 12 selects a sensor node and an actuator node associated with the requirements for the sensing type and actuator type contained in the group specification information, and creates a sensor network. Based on metadata for each US resource stored in the resource metadata repository 14, USN actuating information including information for the identification and connection of each of the sensor node and actuator node constituting the sensor network is generated (S140). The USN actuating information includes the identification of the sensor node and actuator node, which are substantial USN resources constituting the sensor network, the method of operating each of the nodes, and the service logic to be performed in response to a service request.

The sensor network controller 13 issues a request to perform a predetermined operation for each USN resource based on the USN actuating information, and receives a response. Results of performing the operation from the USN resources are passed to the sensor network controller 13. Specifically, the sensor network controller 13 controls the USN resources to perform a predetermined operation for each resource for the sensor type based on the USN actuating information, and receives results of performing the operation from the USN resources for the sensor type and performs the service logic. If a predetermined condition is satisfied by performing the service logic, the USN resources are controlled to perform a predetermined operation for each resource for the actuator based on the USN actuating information, and receive results of performing the operation from the USN resources for the actuator type. Afterwards, the sensor network controller 13 provides, to the service result processor 15, processing results of the USN resources for the sensor type and actuator type and a processing result of performing the service logic (S150 and S160).

The service result processor 15 provides or outputs, to the service equipment 2, the processing results of the USN resources for the sensor type and actuator type and the processing result of performing the service logic, which are passed from the sensor network controller 13 (S170).

According to an exemplary embodiment of the present invention, a logical wireless sensor network can be dynamically formed in response to a service request input from an application or the like, and corresponding USN resources can be managed. It is possible to efficiently create a logical sensor network based on a dynamically created service request and manage USN resources, under the condition that the type or objective of the sensor network and the components constituting the sensor network are not defined in advance.

Accordingly, even if there is no detailed information about currently available USN resources or the available USN resources are changed, a logical sensor network corresponding to a service request can be configured, thereby providing desired service. Moreover, upon termination of service corresponding to a service request, the logical sensor network can be terminated, and therefore the USN resources constituting the sensor network can be used for a different service request.

The exemplary embodiments of the present invention may also be implemented by a program realizing functions corresponding to the construction of the embodiment, and a recording medium on which the program is recorded, other than the apparatus and/or method described above. Such implementation may be easily made from the disclosure of the above embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for managing a sensor network, the method comprising:
   receiving a service request from the outside, and analyzing the received service request;
   generating group specification information including requirements for each of the categories for logical USN (ubiquitous sensor network) resources required to handle the service request based on the analysis result;
   forming a logical sensor network consisting of physical USN resources based on the group specification information;
   generating USN actuating information relating to the physical USN resources, based on metadata relating to the physical USN resources constituting the formal logical sensor network;
   actuating each of the USN resources constituting the logical sensor network based on the USN actuating information; and
   receiving actuation results from the USN resources;
   wherein the USN resources comprise at least either of one sensor node or one actuator node, a sensor group consisting of a plurality of sensor nodes, or an actuator group consisting of a plurality of actuator nodes;
   wherein, in the generating of group specification information, the group specification information comprises the location and sensing condition for a sensing type and the location and actuator operating condition for an actuator type, and further comprises a service logic;
   wherein, in the generating of USN actuating information, the USN actuating information comprises an identifier, connecting information of the USN resources, and an assisted operation representing an operation to be performed by the corresponding USN resources, and further comprises a service logic; and
   wherein the receiving of actuation results comprises:
      issuing a request to perform the corresponding assisted operation for each of the USN resources corresponding to a sensor node based on the USN actuating information;
      receiving a first result of performing the operation for each of the USN resources corresponding to the sensor node;
      performing the service logic based on the first result;
      if the first result satisfies a preset condition as a result of performing the service logic, issuing a request to perform the corresponding assisted operation for each of the USN resources corresponding to an actuator node; and
      receiving a second result of performing the operation for each of the USN resources corresponding to the actuator node.

2. The method of claim 1, further comprising transmitting or outputting the first result and the second result to service equipment.

3. The method of claim 1, wherein, in the analyzing, if the service request contains keywords, the keywords are analyzed to acquire keywords associated with the categories of location, sensing type, sensing condition, actuator type, actuator operating condition, and service logic.

4. The method of claim 3, wherein the analyzing further comprises receiving and analyzing a service request from service equipment including an external application, and passing the actuation results to the service equipment.

5. The method of claim 1 wherein, in the creating of a logical sensor network, a sensor node and an actuator node associated with the requirements for the sensing type and actuator type contained in the group specification information are selected, and
   in the generating of USN actuating information, the USN actuating information comprises information for the identification and connection of each of the sensor node and actuator node constituting the logical sensor network, based on metadata for each USN resource stored in a repository.

6. The method of claim 1, wherein the assisted operation representing an operation to be performed by the corresponding USN resources includes at least one of one-time query, continuous query, and event query.

7. The method of claim 6, wherein the one-time query represents transmitting an information request query once to a sensor node and terminating the query.

8. The method of claim 6, wherein continuous query represents continuously transmitting an information request query to a sensor node during a predetermined period in a cycle requested by the sensor node.

9. The method of claim 6, wherein event query represents transmitting a request query to enable a sensor node to obtain sensing information to the sensing node if an event satisfying a preset condition occurs.

10. An apparatus for managing a sensor network connected to a plurality of USN (ubiquitous sensor network) resources, the apparatus comprising:
    a service request analyzer that receives a service request from the outside, analyzes the received service request, and generates group specification information including requirements for each of the categories for logical USN resources required to handle the service request based on the analysis result;
    a resource metadata repository that stores metadata for each of the USN resources;
    a sensor network generator that forms a logical sensor network consisting of physical USN resources based on the group specification information, and generates USN actuating information relating to the physical USN resources, based on metadata relating to the physical USN resources constituti11g the formed logical sensor network; and
    a sensor network controller that actuates each of the USN resources constituting the logical sensor network based on the USN actuating information, and receives actuation results from the USN resources:
    wherein the USN resources comprise at least either of one sensor node or one actuator node, a sensor group consisting of a plurality of sensor nodes, or an actuator group consisting of a plurality of actuator nodes, and
    the group specification information comprises the location and sensing condition for a sensing type corresponding to a sensor node and the location and actuator operating condition for an actuator type corresponding to an actuator node, and further comprises a service logic;
    wherein the network generator selects a sensor node and an actuator node associated with the requirements for the sensing type and actuator type contained in the, group specification information to form the logical sensor network, and
    the USN actuating information comprises information for the identification and connection of each of the sensor node and actuator node constituting the logical sensor network;
    wherein , the USN actuating information comprises an identifier connectivity information of the USN resources, and an assisted operation representing an operation to be performed by the corresponding USN resources, and further comprises a service logic; and wherein the sensor network controller issues a request to perform the corresponding assisted operation for each of the USN resources corresponding to a sensor node based on the USN actuating information and receives a first result of performing the operation for each of the USN resources, and issues a request to perform the corresponding assisted operation for each of the USN resources corresponding to an actuator node based on the USN actuating information and receives a second result of performing the operation for each of the USN resources corresponding to the actuator node.

11. The apparatus of claim 10, wherein, if the first result satisfies a preset condition based on a result of performing the service logic, the sensor network controller acquires the second result.

12. An apparatus for managing a sensor network connected to a plurality of USN (ubiquitous sensor network) resources, the apparatus comprising:

a service request analyzer that receives a service request from the outside, analyzes the received service request, and generates group specification information including requirements for each of the categories for logical USN resources required to handle the service request based on the analysis result;

a resource metadata repository that stores metadata for each of the USN resources;

a sensor network generator that forms a logical sensor network consisting of physical USN resources based on the group specification information, and generates USN actuating information relating to the physical USN resources, based on metadata relating to the physical USN resources constituting the formed logical sensor network; and a sensor network controller that actuates each of the USN resources constituting the logical sensor network based on the USN actuating information, and receives actuation results from the USN resources;

wherein the USN actuating information comprises an identifier, connectivity information of the USN resources, and an assisted operation representing an operation to be performed by the corresponding USN resources, and further comprises a service logic; and wherein the sensor network controller issues a request to perform the corresponding assisted operation for each of the USN resources corresponding to a sensor node based on the USN actuating information and receives a first result of performing the operation for each of the USN resources, and issues a request to perform the corresponding assisted operation for each of the USN resources corresponding to an actuator node based on the USN actuating information and receives a second result of performing the operation for each of the USN resources corresponding to the actuator node.

13. The apparatus of claim 12, wherein the formed logical sensor network may be terminated upon termination of a service according to the service request.

14. The apparatus of claim 12, wherein the assisted operation representing an operation to be performed by the corresponding USN resources includes at least one of one-time query, continuous query, and event query.

* * * * *